F. E. BOYD.
Cartridge.
No. 99,528.
Patented Feb. 8, 1870.
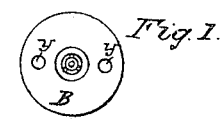
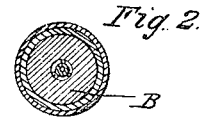
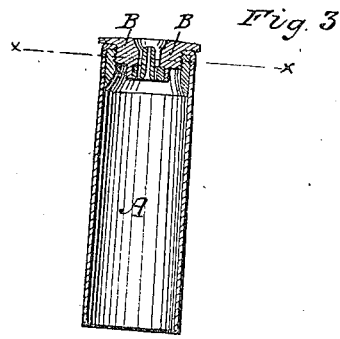
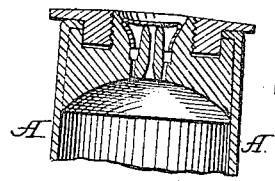
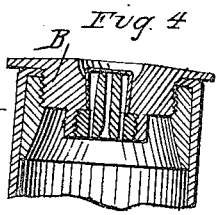
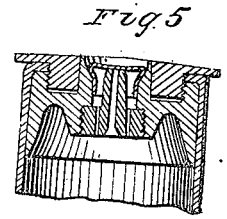
witnesses
Inventor

UNITED STATES PATENT OFFICE.

FRANCIS E. BOYD, OF BOSTON, MASSACHUSETTS.

IMPROVEMENT IN METALLIC CARTRIDGES.

Specification forming part of Letters Patent No. 99,528, dated February 8, 1870.

*To all whom it may concern:*

Be it known that I, FRANCIS EVERETT BOYD, of Boston, in the county of Suffolk and State of Massachusetts, have invented certain new and useful Improvements in Cartridges; and I do hereby declare that the following is a full, clear, and exact description thereof, reference being had to the accompanying drawings, making a part of this specification, in which—

Figure 1 is an end view of the cartridge. Fig. 2 is a section on the line *x x* of Fig. 3. Fig. 3 is a longitudinal section. Fig. 4 is a portion of Fig. 3 enlarged. Figs. 5 and 6 show modifications of my invention. The circular cavities *y y* in the head serve to hold it while the washer is being screwed upon it.

The first part of my invention is a cartridge composed of a metal shell, a head, washer, and nipple, when the head, washer, and nipple are screwed to the shell, as shown, so that they may be readily removed and replaced, or secured to a fresh shell. The shell is of the form shown in the drawings. It is cold-drawn in the ordinary way, and the metal should thicken slightly toward the breech from the muzzle, which thickening will be produced by the operation of cold-drawing. Care should be taken to make the shell of a uniform temper. The head is connected to the shell by means of the washer, the latter being placed inside of the shell, resting against the interior of the flange, so that the screw upon the head can engage with the washer and clamp the flange between the washer and head. The nipple is screwed into the head.

I prefer to make the washer in the form shown in Figs. 3 and 4, in order to give a curved form to the interior of the cartridge, and also because this form is less affected by the shock of the discharge. I also prefer to make the washer a nut, and to form the screw upon the head; but this may be reversed, as shown in Fig. 6, in which the head is the nut and the screw is upon the washer. The nipple also may be screwed into the washer instead of into the head, or may be formed in one piece with the head in a well-known way, or may be in one piece with the washer, as shown in Fig. 6; but this necessitates making the washer of steel, while brass is preferable. These modes of embodying this part of my invention I regard as less perfect than the first mode.

I am aware that the shell shown is not new, and also that it is not new to combine a head with this shell by means of a washer, so that the flange of the shell is clamped between the head and the washer, all this being shown in the English patent of Schneider, No. 2,203 of the year 1861. I am also aware that a head with a nipple combined with it is not new, as this is shown in the patent to J. Ryder, November 5, 1867; and I am also aware that a head and washer combined together by means of a nipple is not new, as this is shown in the patent to T. F. Cullen, January 7, 1868.

The method of connecting the head with the shell in the first of these cartridges is very simple and effective, and free from the disadvantages of the methods of connecting their parts in the other two; but, on the other hand, a common cap can be used with the two latter, while a special cap, or a cap and anvil, are required with the former.

The object of this part of my invention is to furnish a cartridge having all the excellences of these cartridges without any of their disadvantages; and this is attained by combining the shell and washer of the first with the head and nipple of the second—to use these two cartridges as illustrations.

The second part of my invention relates to what is known as the "gas-check;" and consists in the use of a nipple smaller than the cap, and in the center of a recess of a peculiar form, in connection with one or more vents outside the nipple. As shown in Figs. 3, 4, 5, and 6, the nipple is in the center of a recess whose walls incline outward from the bottom of the recess. The recess is consequently larger at the top than at the bottom, and its diameter should be slightly less at the bottom than that of the cap used, so that the edges of the cap shall be curved in slightly when forced down upon the nipple. At the bottom of the recess I drill one or more extra vents, so that the gas generated by the fulminate, which lies outside of the vent in the nipple, may escape into the powder of the cartridge. The nipple should be too small to fill the cap, but large enough to give it proper strength. If it is too snug a fit the cap will be broken; and there must also be a vent through the snug a fit, the cap will be broken, and there must also be a vent through the nipple; otherwise the head of the cap will be blown off, and in either event the gas will escape.

The operation of my gas-check is as follows: When the hammer strikes the cap and explodes the fulminate, the gas from the fulminate ignites the charge through one or more of the vents, the outer vents also allowing the gas between the walls of the cap and the nipple to escape. The walls of the cap are forced out against the walls of the recess, which should be so close to the cap as to support it when distended by the discharge, so as to prevent the gas escaping outside the cap, and as the cap remains unbroken, and is prevented from moving by the hammer, it acts as a valve to close all the vents. After the discharge the cap can be readily removed, owing to the outward inclination of the walls of the recess.

I prefer to increase the flare of these walls, as shown in the drawings, around the upper part of the cap, as the removal of the cap from the cartridge is thereby made easier, and the cap assumes the form shown in Figs. 5 and 6, thereby forming a second gas-check. Nipples in a recess have heretofore been used in connection with extra vents; but the walls of the recess have never heretofore been made flaring, so that the cap would be forced against them before the discharge, as well as by the discharge. The nipple also has always been made large enough to fill the cap, in order to prevent the cap from falling off, while in my gas-check the cap is kept in its place by binding upon the walls of the recess.

I do not claim the shell, washer, head, or nipple; nor do I claim these elements in all possible combinations; but What I do claim, and desire to secure by Letters Patent, is—

1. A cartridge consisting of a metal shell, head, washer, and nipple, when these several parts are each constructed and all combined together as set forth.

2. The combinations of the flared recess, small nipple, and extra vent-holes, the whole being and operating substantially as described.

FRANCIS E. BOYD.

Witnesses:
J. E. MAYNADIER,
CHAS. F. SLEEPER.